June 24, 1930.  H. A. S. HOWARTH  1,767,238

BEARING

Filed Nov. 27, 1926  4 Sheets-Sheet 1

Inventor

Harry A. S. Howarth,

By Mauro, Cameron, Lewis & Kerkam,

Attorneys

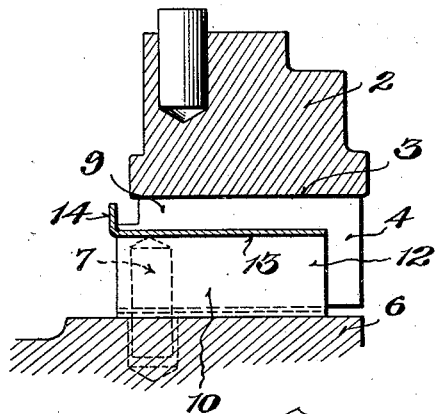
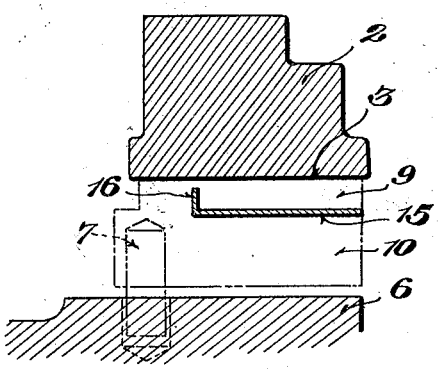
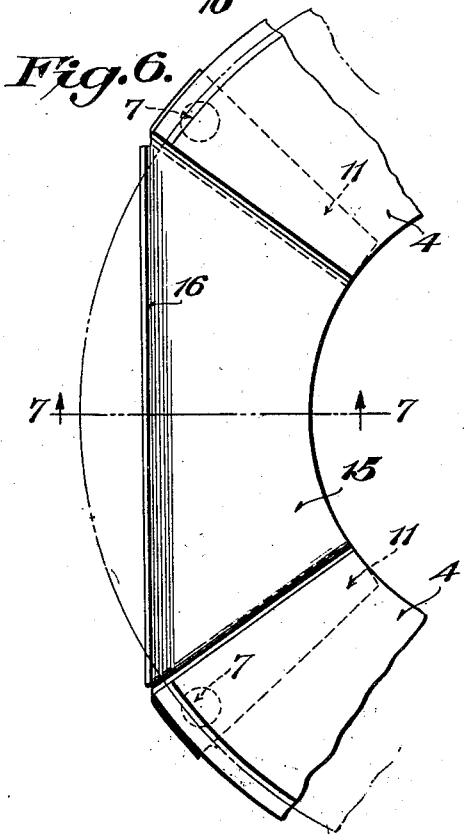
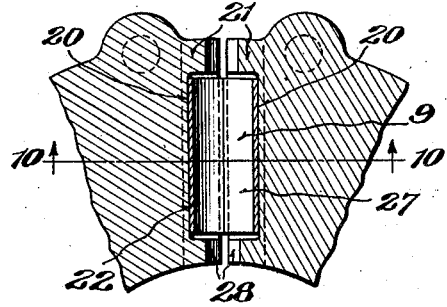
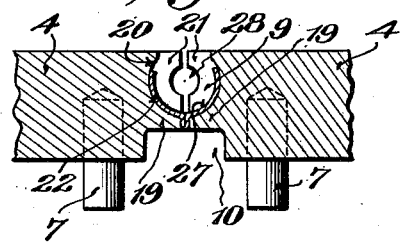

June 24, 1930.  H. A. S. HOWARTH  1,767,238
BEARING
Filed Nov. 27, 1926  4 Sheets-Sheet 3
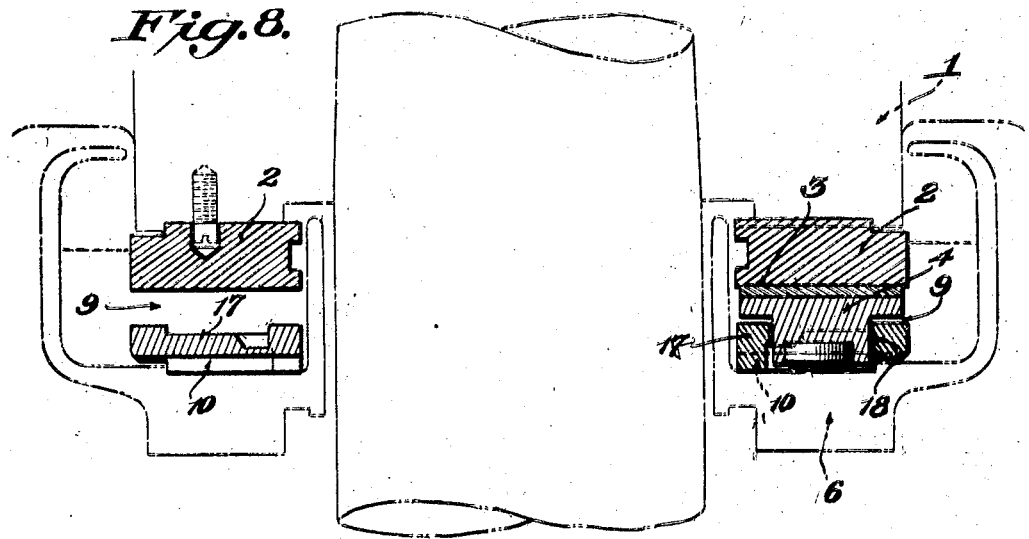
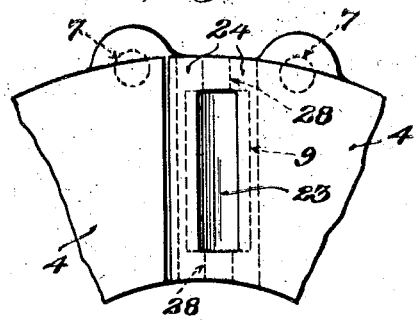
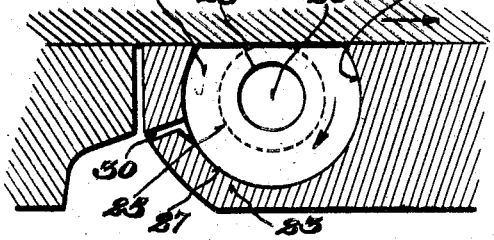
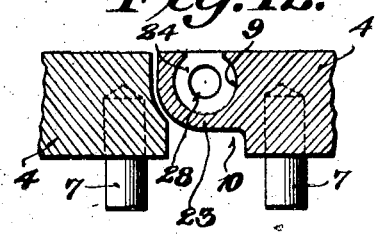
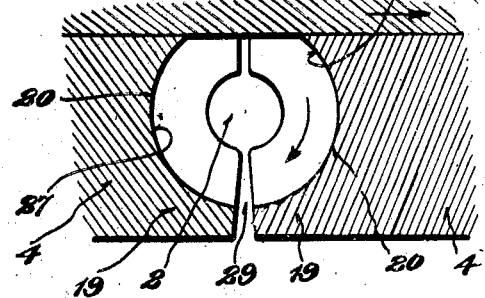
Inventor
Harry A. S. Howarth,
By Mauro, Cameron, Lewis & Markum
Attorneys June 24, 1930.  H. A. S. HOWARTH  1,767,238
BEARING
Filed Nov. 27, 1926   4 Sheets-Sheet 4
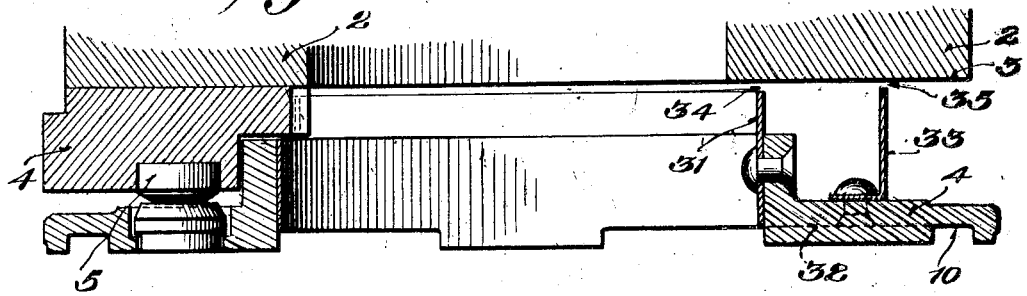
Fig. 15.
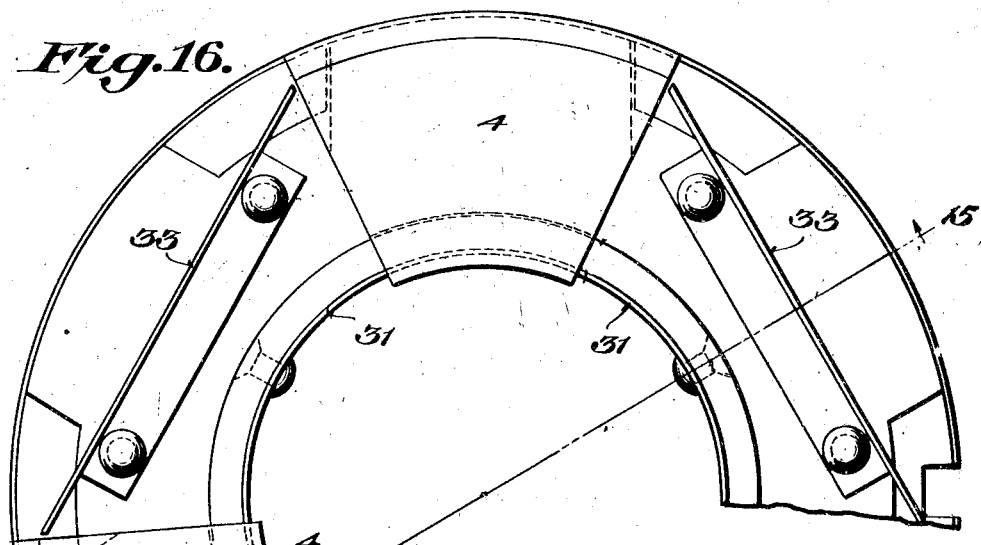
Fig. 16.
Fig. 17.
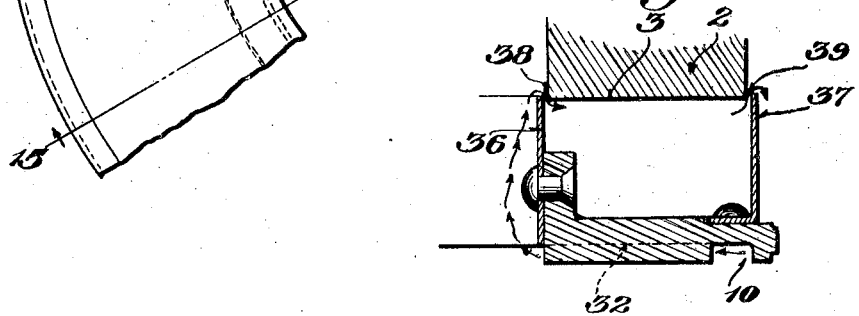
Inventor
Harry A. S. Howarth
By Mauro, Cameron, Lewis & Kerkam
Attorneys Patented June 24, 1930

1,767,238

UNITED STATES PATENT OFFICE

HARRY A. S. HOWARTH, OF FRANKFORD, PHILADELPHIA, PENNSYLVANIA, ASSIGNOR TO KINGSBURY MACHINE WORKS, INC., OF FRANKFORD, PHILADELPHIA, PENNSYLVANIA, A CORPORATION OF DELAWARE

BEARING

Application filed November 27, 1926. Serial No. 151,215.

This invention relates to bearings, and particularly to bearings of the type employing a plurality of bearing segments or shoes which are adapted to form wedge-shaped oil films by reason of the pivotal or flexible movement of said segments or shoes, although certain features of this invention are applicable to bearings of other construction. The invention has particular utility when embodied in thrust bearings, although certain features are applicable to journal and other bearings.

As heretofore constructed, thrust bearings have been provided with channels across one or both of the cooperating bearing members, as by the provision of intervening spaces between the successive bearing shoes or segments, through which the oil may circulate, and from which the oil of the films is taken, the direction of circulation of the oil through these channels being sometimes radially inward, but more often radially outward. It is an object of this invention to provide a bearing wherein separate channels are provided between successive shoes or segments so that the oil will flow in opposite directions in the spaces between successive shoes or segments.

The relative rotation between the bearing members tends to set the oil in the intersegment or intershoe spaces into rotation around an axis which is approximately parallel to the bearing surfaces or, in the case of thrust bearings, radial with respect to the bearing axis. It is an object of this invention to provide a bearing which takes advantage of this tendency of the oil to rotate in the intersegments or intershoe spaces and to facilitate this tendency to increase the abstraction of heat from the bearing members, and also, if desired, to separate foreign matter from the oil before it enters the oil film of an adjacent shoe or segment.

Another object of this invention is to provide a bearing with means between the shoes or segments whereby air or dirt, or both, are separated from the oil by reason of the rotary movement of the oil in the intershoe or intersegment spaces.

Another object of this invention is to provide a bearing of the character described with means for properly controlling or restricting the flow of oil through the intershoe or intersegment spaces so as to minimize the introduction of air and prevent the oil from being moved away from the bearing surfaces too rapidly by reason of the relative movement of the bearing members.

Another object of this invention is to provide a thrust bearing which is particularly suitable for high speed work and which is so constructed as to secure an adequate circulation of the oil for the abstraction of heat from the bearing surfaces and the formation of suitable oil films and which at the same time is simple and rugged in construction and efficient in operation.

Other objects will appear as the description of the invention proceeds.

The invention is capable of receiving a variety of mechanical expressions, several of which are shown on the accompanying drawings more or less diagrammatically, but it is to be expressly understood that the drawings are for purposes of illustration only, and are not to be construed as a definition of the limits of the invention, reference being had to the appended claims for that purpose.

Referring to the drawings, wherein the same reference characters are employed to designate corresponding parts in the several figures:—

Fig. 5 is a fragmentary radial section on the line 5—5 of Fig. 4;

Fig. 6 is a fragmentary plan view of another embodiment of the present invention;

Fig. 7 is a fragmentary radial section on the line 7—7 of Fig. 6;

Fig. 8 is a radial section of another bearing embodying the present invention;

Fig. 9 is a fragmentary section of the adjacent ends of two bearing shoes or segments constituting another embodiment of the present invention;

Fig. 10 is a section on the line 10—10 of Fig. 9;

Figs. 11 and 12 are fragmentary plan and sectional views, respectively, of another embodiment of the present invention;

Figs. 13 and 14 are enlarged fragmentary sections illustrating provisions for the withdrawal of dirt from the oil in the intershoe spaces;

Fig. 15 is a fragmentary radial section of another bearing embodying the present invention, taken on the line 15—15 of Fig. 16;

Fig. 16 is a fragmentary plan view of the embodiment of Fig. 15; and

Fig. 17 is a fragmentary axial section of still another embodiment of the present invention.

Figure 1:
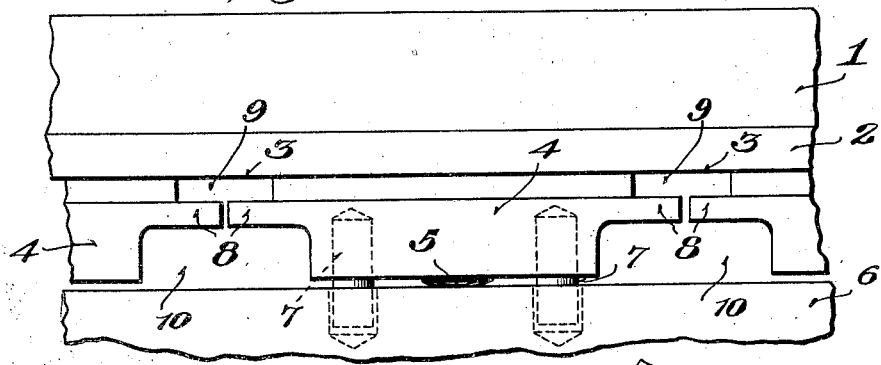
Fig. 1 is a fragmentary elevation, developed into a plane, of a thrust bearing of the pivoted shoe type embodying the present invention.
Figure 2:
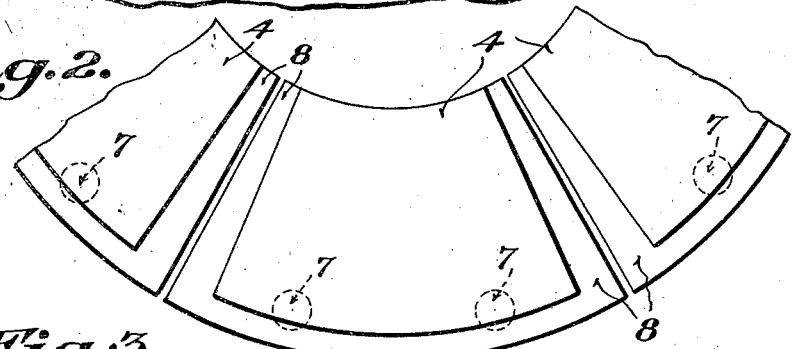
Fig. 2 is a fragmentary plan view of the embodiment of Fig. 1.

Referring first to the form shown in Figs. 1 and 2, a thrust block is diagrammatically indicated at 1, the same being provided in any suitable way with a thrust collar 2. Cooperating with the bearing surface 3 of said thrust collar are a plurality of bearing shoes or segments 4 of any suitable form and construction, the same being shown as provided with rear projections 5 having curved surfaces by which they are pivotally or tiltably mounted on a support 6, shown as a simple, stationary supporting ring. In so far as the oil circulating features of this invention are concerned, however, the support 6 may be taken as typical of any suitable equalizing means as an equalizing ring, or a series of equalizing plates, or a rocking support, or a base ring provided with jack screws, etc. The shoes may be maintained in proper relationship with the support 6 in any suitable way but in the form shown each shoe is secured in operative position by dowel pins 7 which engage in recesses in one and are mounted in the other of the associated shoes 4 and ring 6. This construction provides a particularly simple and efficient means for securing the shoes in operative position on the ring 6, whether it be an equalizing or non-equalizing support, as the shoes may be readily moved radially into and out of operative position when the collar 1 and ring 6 are moved relatively by a distance equal to the extent of projection of the dowel pins. But in so far as the oil circulating features of the invention are concerned, the structure so far described may be taken as a typical and diagrammatic representation of any suitable construction of thrust bearing.

In conformity with the present invention the space between the successive shoes or segments 4 is divided in any suitable way into a pair of channels through which the oil may circulate in opposite directions. In the form shown in Figs. 1 and 2, each shoe 4 is provided on its radial edges with a ledge 8 so that a pair of contiguous ledges 8 will cooperate to divide the intershoe spaces into a pair of channels 9 and 10, respectively. In place of using a pair of ledges 8, each shoe may obviously be provided with a single ledge of substantially double the width so as to nearly or quite bridge the space between adjacent shoes. The partition formed by the ledges 8 is so positioned with respect to the axial depth of the intershoe space that the channels 9 and 10 are of appropriate size taking into consideration the character of oil circulation, the speed and size of the bearing, etc. Where forced circulation is employed oil may flow radially inward through the channel 9 and radially outward through the channel 10. Where the circulation is effected by the action of the rotatable bearing member on the oil in contact therewith, the oil will flow radially inward through the channel 10 and radially outward through the channel 9, in which event the size of the channel 9 must not be so great that at the designed rate of rotation of the movable bearing member the forces acting on the oil in the channel 9 will tend to throw the same out more rapidly than it is received. It is to be understood that the channels 9 and 10 are in communication through the usual spaces provided around the inner periphery of the bearing segments or shoes, and that said channels communicate with the body of oil in the oil well or with suitable inlet and outlet passages at their radially outer extremities.

Owing to the division of the intershoe or intersegment spaces into the two channels 9 and 10 the oil flows radially across the bearing surface 3 of the rotatable bearing member 2, abstracting heat from the bearing member, and at the same time supplying the bearing surfaces with the oil which maintains the wedge-shaped oil films. In the other channel 10, the oil is flowing in the radially opposite direction, supplying the inner end of the channel 9 with oil if the direction of circulation in the latter is radially outward, or constituting an outlet channel for the oil if the oil in the channel 9 is flowing radially inward.

Figure 3:
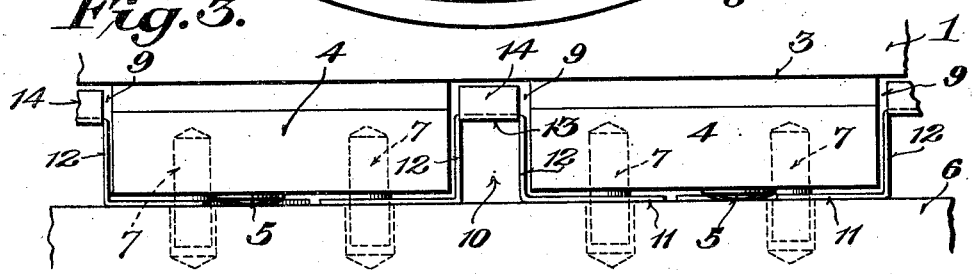
Fig. 3 is a fragmentary elevation and developed into a plane, of another embodiment of the present invention.
Figure 4:
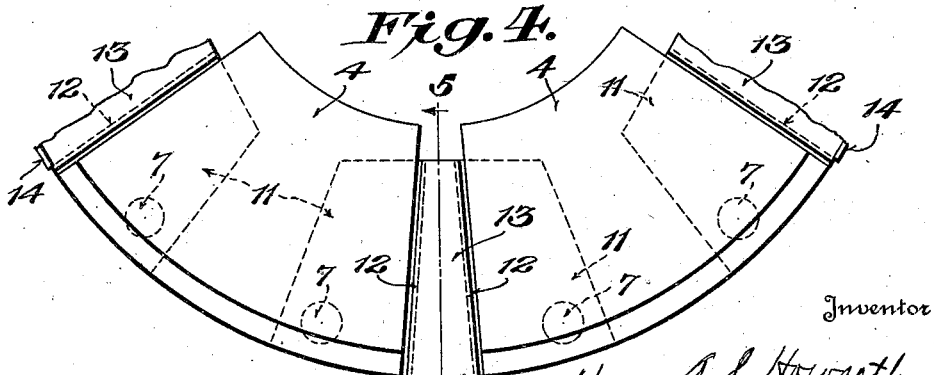
Fig. 4 is a fragmentary plan view of the embodiment of Fig. 3.

In the form shown in Figs. 3, 4 and 5 the ledges 8 on the shoes 4 are omitted and the division of the intershoe space into a plurality of radial channels in which the oil is circulating in radially opposite directions is effected by the interposition of a separate member of any suitable construction. In the form shown this interposed member 11 is formed from sheet metal which may be cut from a blank and bent to shape. As shown more particularly in Fig. 3, said member 11 is bent into substantially the form of a channel 12 intermediate its length, the depth of said channel, measured in an aixal direction, being determined, as in the embodiment of Figs. 1 and 2, so that the channels 9 and 10 shall be of the proper size taking into consideration the character of oil circulation, size and speed of bearing, etc. The wall 13 of the channel may be made parallel to the bearing surface 3, or it may be made inclined to the bearing surface 3, for reasons which will more fully appear hereinafter. To constrict the flow of oil from the channel 9, the member 11 may also be provided with a tab 14, shown as bent up from the blank of the member 11, said tab being of suitable shape and size to restrict the circulation of oil through the channel 9 to the desired extent. A separate member 11 may be provided for each intershoe space, as illustrated, and suitably attached to the support 6, or the means for dividing the several intershoe spaces into channels may be formed as a unit, the channel-shaped depressions 12, for example, being formed at appropriate distances in an elongated strip of sheet metal.

In the form shown in Figs. 3, 4 and 5, the bearing shoes or segments 4 are illustrated as positioned relatively close together. In the form shown in Figs. 6 and 7, the shoes are shown as spaced relatively far apart, as in the case where three shoes are equally spaced around the bearing axis. The intershoe space is divided into the channels 9 and 10 by a separator 15 of the general character shown in the embodiment of Figs. 3, 4 and 5, but the axially directed flange or tab 16 which constricts the opening at the radially outer end of the channel 9 is here shown as extending as a chord of the arc embraced between successive shoes. The channel 9 has the full radial width of the shoes at its opposite extremities, adjacent the leading and trailing edges of the shoes, while the constriction afforded by the flange or tab 16 assures the proper rate of circulation through said channel 9. If desired, however, the member 15 may be shaped so that the flange or tab 16 shall be of arcuate shape and conform more or less with the periphery of the rotatable bearing member.

In the form shown in Fig. 8, the intershoe or intersegment spaces are divided into appropriate channels 9 and 10 by the use of a shoe cage 17, shown as apertured at 18 to receive and position the shoes 4. As shown more particularly at the left-hand side of Fig. 8, the cage 17 in the intershoe spaces constitutes a radially extending partition which divides each of said spaces into the pair of channels 9 and 10, the relative size of the channels being determined, in view of the considerations heretofore discussed, by the shape and size of the cage at the intershoe spaces. The cage may be, if desired, provided with axially extending projections, integral therewith or attached thereto, for constricting the passage 9.

In the form shown in Figs. 9 and 10, the shoes 4 are provided with projections 19 at their radial edges, each of said projections being recessed as shown at 20, so that a pair of contiguous projections 19 will, by reason of the recesses 20, form the channel 9 within the body of the shoes, the channel 10 being formed below the projections 19 as in the embodiment of Figs. 1 and 2. The channel 9 may be constricted at one or both ends by means of peripherally or transversely projecting flanges 21. If desired, a member 22, formed of any suitable material such as sheet metal, may be shaped to fit the recesses 20 and complete the partition between the contiguous shoes.

In the form shown in Figs. 11 and 12, each shoe 4 is provided at one of its edges with a projection 23 within which is formed the channel 9, the channel 10 being formed below the projection 23 as in the embodiment of Figs. 1 and 2. If desired, channel 9 may be constricted at one or both of its ends by a peripherally or transversely directed flange 24.

The oil in the channel 9, in these several embodiments, is in contact with the rotatable bearing member 2, and the movement of said bearing member tends to set said oil in the channel 9 into rotation around an axis extending radially of the bearing member. As the outer periphery of the rotatable bearing member is moving at a greater lineal speed than the inner periphery of said bearing member, the oil at the radially outer end of the channel 9 is set into a higher speed of rotation than is the oil at the radially inner end of said channel. The character of the oil rotation in this channel also depends upon the shape of the channel, the oil tending to rotate in cylindrical surfaces when the sides of the channel are parallel and in conical surfaces when the space between the shoes flares outwardly. In either event, as centrifugal force is also acting on the oil, the oil tends to move in a helical path. This rotary movement of the oil increases the amount of oil that is brought into contact with the rotatable bearing member to abstract heat therefrom, and the construction of the channel 9 as shown in Figs. 9 to 11 facilitates this rotary movement.

Advantage may also be taken of this rotary movement of the oil for separating foreign material from the oil so that cleaner oil enters the spaces between the bearing surfaces to form the oil films. Referring to Fig. 14, the oil in the cylindrical surface indicated in dotted lines at 25, and which is tangent to the bearing surface 3, is rotating at a lineal speed which approximates the lineal speed of the rotatable bearing surface 3; at the center 26 the lineal velocity is zero, and the oil in contact with the stationary peripheral surface 27 also has zero lineal velocity. Therefore, any foreign matter in the oil which is of less specific gravity than the oil, such as air, tends to move toward the center 26, while foreign matter of greater specific gravity than the oil, such as dirt, tends to move toward the surface 27. In the latter case a certain percentage of the heavier material will be thrown against the rotatable bearing surface 3, but the major portion of the heavier material will collect on the surface 27. Advantage is preferably taken of this tendency of the rotating oil to separate foreign matter, so that the oil entering the oil film shall be as clean as possible, and to this end the channel 9 in each of the embodiments shown in Figs. 9 to 14 inclusive is provided with a centrally arranged outlet opening 28 so that the air and other light material which tend to collect at the center of the rotating oil may escape from the intershoe spaces without entering the oil film. Means may also be provided to permit the heavier particles which collect on the surface 27 to escape from the channel 9. In the structure shown in Fig. 10, wherein a complete partition 22 is formed between the contiguous shoes, the dirt which collects on the surface 27 may tend to creep around the periphery of the channel 9 to the bearing surface 3 under the action of the rotating oil. To permit the dirt which collects on the surface 27 to escape from channel 9, a space 29 may be left between the contiguous ends of adjacent shoes so that the dirt will settle by gravity through this opening 29, as shown in Fig. 13, or as shown in Fig. 14, an outlet 30 may be provided at a suitable position in the peripheral surface of the channel 9 so that any dirt which tends to creep along the periphery of said channel may have a chance to escape through said outlet.

In the embodiment of Figs. 15 and 16, means are provided to minimize or prevent the suction of air into the oil as it flows radially outward in contact with the rotary bearing surface. Experience has demonstrated, especially in the case of high speed bearings, that the oil may be moved so rapidly by the action of the rotatable bearing member, that considerable air may be drawn into the oil at the inner periphery of the rotatable bearing member or the oil level may be depressed out of contact with the inner edge of the rotatable bearing surface.

In the form shown in Figs. 15 and 16, an inner baffle 31 is mounted in any suitable way, as by attachment to the inner periphery of the cage 32, or to the support 6, so as to constrict the radially inner end of the intershoe spaces and assure that the oil flowing into said spaces shall seal the same against the admission of air. Means are also provided for constricting the flow from the intershoe spaces, an outer baffle plate being shown as interposed across each of said spaces at or adjacent the outlet end thereof. This baffle 33 may be an axially extending flange or tab of the character shown at 14 in Figs. 3, 4 and 5 or at 16 in Figs. 6 and 7, or it may be any suitable baffle attached to a cage of the character shown in Fig. 8, or it may be attached to the support 6 if it is not desired to divide the intershoe space into a pair of channels through which the oil is to circulate in opposite directions. When the baffles 31 and 33 are associated with constructions of the character shown in Figs. 1 to 14 inclusive wherein the intershoe space is divided into a pair of channels, the partition thus forming the two channels may be made parallel to the rotatable bearing surface 3 or it may be inclined with respect to said surface in either direction so as to obtain the proper size and shape of channel, or in some instances this partition may be so designed as to render either or both of said baffles unnecessary.

The passage leading the oil radially outward across the rotatable bearing surface should be as large as possible, taking into consideration the bearing size and speed and character of lubrication, and yet so restrict the flow of oil therethrough under the action of the rotatable bearing member as to prevent the drawing of air into the circulating oil. The greater the circulation of oil, the more the heat is abstracted from the bearing members, but where the head for effecting oil circulation is relatively low, as in the case where the circulation is dependent upon the action of the rotatable bearing member, the tendency of said member to move the oil outwardly through the channel 9 may be greater than the head for returning oil to the inlet of said channel, permitting air to be drawn into said channel with the oil. The inner baffle 31, or the inlet to the channel 9 by reason of the character of the partition in the intershoe space, in accordance with the present invention, assures that the inlet to the channel 9 is sealed with oil, the amount of oil that can flow between said baffle and the rotatable member at 34 being insufficient to lower the oil level at the inner edge of the rotatable bearing member, under the existing head, to a position where air may enter said channel. At the same time, the baffle 33 is so related to the rotatable bearing member, or the form of the channel 9 is so selected by reason of the character of the partition in the intershoe space, as to assure that the discharge of oil from said channel 9 through outlet 35 will not be so great as to exceed the rate of supply at the inlet to said channel. The relation of the inner and outer baffles to the rotatable bearing member will vary with different sizes and speeds of bearing, but may be readily determined for any given size and speed of bearing, the spaces between said baffles and the rotatable member decreasing as the speed increases or increasing as the speed decreases.

In the embodiment of Figs. 15 and 16, the inlet 34 and the outlet 35 for the oil flowing through the intershoe spaces is determined by the axial distance between the bearing surface 3 and edges of the baffles 31 and 33. If for any reason, as the refinishing of the bearing surfaces, the axial distance between the support 6 and the bearing surface 3 is diminished, the inlet and outlet openings 34 and 35 are also diminished and the rate of oil circulation is therefore changed. In order to avoid this effect the arrangement shown in Fig. 17 may be employed, wherein the inner baffle 30 is mounted so as to be radially inside of the inner periphery of the bearing surface 3, and to project axially beyond said surface a employed, wherein the inner baffle 36 is similarly arranged with respect to the outer periphery of said bearing surface 3. The inlet 38 and the outlet 39 of the channel 9 are now determined by the radial distances between the edges of the bearing surface 3 and the inner faces of the baffles 36 and 37, and the lowering of the bearing surface 3 by slight distances will have no appreciable effect upon the quantity of oil circulating through the intershoe spaces.

It will therefore be perceived that simple means have been provided whereby the space between contiguous bearing segments or shoes is divided into a pair of channels through which the oil may flow in radially opposite directions, the oil flowing through one of these channels radially inward and through the other of these channels radially outward, to abstract heat from the bearing members and to supply oil to the films. It will also be perceived that the tendency of the oil in the intershoe spaces to rotate has been facilitated and advantage has been taken thereof for the separation from said oil of foreign matter. While it is preferred to combine this feature of the invention with the use of two channels in the intershoe spaces, as heretofore described, it is to be expressly understood that, within the broader aspects of the invention, the intermediate partition may be omitted so that the entire body of oil between the shoes is in rotation and, within this aspect of the invention, said rotation may be facilitated and advantage may be taken of said rotary motion to separate foreign matter from the oil. It will also be perceived that means have been provided whereby the circulation through the intershoe spaces has been so controlled as to minimize or prevent the entrainment of air in the circulating oil, and this feature of the invention may be used either with or without the features heretofore described. Moreover, the present invention provides for the obtaining of the novel results by means which are simple and rugged in construction.

While the invention has been shown as embodied only in a thrust bearing, certain features of the invention may be embodied in journal and other bearings by constructing the intershoe spaces in conformity with this invention. For example, the bearing segments or shoes of a journal bearing may have their contiguous ends constructed as illustrated in Figs. 9 to 14 so that as the oil flows lengthwise of the shaft between the bearing shoes its rotary motion will be facilitated and air, or dirt, or both, may be separated from the oil. Also, if desired, both with thrust bearings and other types of bearings, the passages for permitting the escape of air, or dirt, or both, may communicate with suitable channels for leading the foreign material away from the oil circulating in proximity to the bearing surfaces. In the case of journal and other bearings, the intershoe spaces may also be divided into channels for permitting the reverse circulation of the oil therethrough as heretofore explained.

While the embodiments of the invention illustrated on the drawings have been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, and certain features used without other features, without departing from the spirit of the present invention. While the invention has only been illustrated as applied to bearings employing stationary shoes which are physically separate, the invention is not restricted thereto, and it is to be expressly understood that some of the advantages of the present invention may be obtained with the use of relatively movable shoes or with the use of bearing members of flexible or semi-flexible constructions. While the channels between the shoes have been shown as in axial alignment, other relative dispositions of said channels may be employed so long as the intershoe or intersegmental space is provided with suitable channels through which the oil may flow in opposite directions. The partition between the channels, as the ledges 8 of Figs. 1 and 2, the interposed member 11 of Figs. 3 to 5, etc., may be inclined radially or circumferentially or both to obtain the desired shape and size of channels for proper oil circulation, or the partitions in the intershoe spaces may be otherwise formed to control the inlet or the outlet or both of either or both of said channels. The invention may also be embodied in bearings for horizontal or vertical or inclined shafts. Reference is therefore to be had to the claims hereto appended for a definition of the limits of the invention.

What is claimed is:

1. In a bearing, in combination with an oil well and relatively movable bearing members including bearing segments, means extending throughout the major portion of the width of adjacent segments for dividing the intersegmental space into channels, the outlet of one channel being in communication with the inlet of the other channel and the opposite extremities of said channels being in communication with said oil well, whereby the oil will circulate through said channels in succession and in opposite directions.

2. In a bearing, in combination with an oil well and relatively movable bearing members including bearing segments, means extending throughout the major portion of the width of adjacent segments for dividing the intersegmental space into two channels, the outlet of one channel being in communication with the inlet of the other channel and the opposite extremities of said channels being in communication with said oil well, whereby the oil will circulate through said channels in succession and in opposite directions, one of said channels providing flow of the oil radially across and in contact with the relatively movable bearing member which cooperates with said segments.

3. In a bearing, in combination with an oil well and relatively movable bearing members including bearing segments, means extending throughout the major portion of the width of adjacent segments for dividing the intersegmental space into a channel adjacent the bearing surfaces through which the oil flows radially outward and a second channel, said inlet communicating with the outlet of said second channel and said channels having their opposite extremities in communication with said oil well whereby oil flows from said well through said channels in succession through which the oil flows radially inward to the inlet of said first named channel.

4. In a bearing, in combination with an oil well and relatively movable bearing members including bearing segments, means extending throughout the major portion of the width of adjacent segments for dividing the intersegmental space into a channel adjacent the bearing surfaces through which the oil flows radially outward to said oil well and a second channel through which the oil flows radially inward from said oil well to the inlet of said first named channel and having its outlet in communication with said inlet whereby the oil flows through said channels in succession, said last named channel being of greater cross section than said first named channel.

5. In a bearing, in combination with relatively movable bearing members including bearing segments, means extending throughout the major portion of the width of adjacent segments for dividing the intersegmental space into a pluraltiy of channels which communicate at one end and through which the oil will circulate in opposite directions, and means for restricting the outlet of one of said channels.

6. In a bearing, in combination with relatively movable bearing members including bearing segments, means extending throughout the major portion of the width of adjacent segments for dividing the intersegmental space into a plurality of channels which communicate at one end and through which the oil will circulate in opposite directions, one of said channels leading oil across the relatively movable bearing surface, and means for restricting the outlet of said last named channel.

7. In a bearing, in combination with an oil well and relatively movable bearing members including bearing segments, means extending throughout the major portion of the width of adjacent segments for dividing the intersegmental space into two channels spaced axially of the shaft and communicating at their radially inner ends, the radially outer ends of said channels communicating with said oil well whereby the oil flows through said channels in succession.

8. In a bearing, in combination with relatively movable bearing members including bearing segments and an oil well surrounding said bearing members, means on and extending throughout the major portion of the width of adjacent segments and constituting a partition in the inter-segmental space for dividing said space into two channels having the inlet of one and the outlet of the other communicating with said surrounding body of oil, the opposite extremities of said channels being in communication so that oil will circulate through said channels in succession and in opposite directions.

9. In a bearing, in combination with relatively movable bearing members including bearing segments and an oil well surrounding said bearing members, means in each intersegmental space dividing said space into channels which communicate with said oil well at one end and with each other at their other end, said member being so disposed with respect to the bearing member cooperating with said segments that the cross section of the channel adjacent said member has such a relation to the cross section of the other channel that the centrifugal action of said member on the oil in said first channel will not cause the oil to flow therethrough more rapidly than it can flow thereto through said second channel under the head of oil existing in the oil well.

10. In a bearing, in combination with relatively movable bearing members including bearing segments, a member in an intersegmental space dividing said space into channels which are in communication at one end and through which the oil will circulate in succession in opposite directions, and means on said member for restricting the outlet of the channel in proximity to the relatively movable bearing surface.

11. In a bearing, in combination with relatively movable bearing members including bearing segments, a member forming a partition in an intersegmental space and dividing said space into two channels spaced axially of the shaft and communicating at their inner ends, and a flange on said member projecting toward the relatively movable bearing member and constricting the outlet of the channel in proximity thereto.

12. In a bearing, in combination with relatively movable bearing members including bearing segments, means in an intersegmental space dividing said space into communicating channels through which oil will circulate in succession in opposite directions, said means being so formed with respect to the bearing surfaces of said members as to constrict the outlet of the channel adjacent the bearing surfaces.

13. In a bearing, in combination with an oil well and relatively movable bearing members including bearing segments, means in the intersegmental space between adjacent segments and extending throughout the major portion of the width thereof for dividing said space into channels which communicate with each other at one end and with the oil well at the opposite end and through which oil will circulate in succession in opposite directions, said means providing inlet and outlet openings between the same and the relatively movable bearing member and said outlet opening being no greater than said inlet opening.

14. In a bearing, relatively movable bearing members including bearing segments providing intersegmental oil channels which communicate at one end for flow of the oil therethrough in succession and one of which is shaped to facilitate the rotary movement of the oil therein and through which the oil will flow in contact with the relatively movable bearing surface.

15. In a bearing, the combination of relatively movable bearing members including bearing segments providing intersegmental oil channels which communicate at one end for flow of the oil therethrough in succession and one of which is shaped to facilitate the rotary movement of the oil therein, and means whereby air is centrally withdrawn therefrom.

16. In a bearing, the combination of relatively movable bearing members including bearing segments providing one or more intersegmental oil channels shaped to facilitate the rotation of oil therein, and means whereby dirt is withdrawn peripherally therefrom.

17. In a bearing, the combination of relatively movable bearing members including bearing segments providing one or more intersegmental oil channels shaped to facilitate the rotation of the oil therein, means whereby air is withdrawn centrally from the channel and means whereby dirt is withdrawn peripherally from said channel.

18. In a bearing, in combination with relatively movable bearing members including bearing segments, means in an intersegmental space dividing said space into superimposed communicating channels through which the oil circulates in succession in opposite directions, and means whereby air is withdrawn centrally from the channel in proximity to the movable bearing surface.

19. In a bearing, in combination with relatively movable bearing members including bearing segments, means in an intersegmental space dividing said space into channels in which the oil circulates in opposite directions, and means whereby dirt is withdrawn peripherally from the channel in proximity to the movable bearing surface.

20. In a bearing, in combination with relatively movable bearing members including bearing segments, means in an intersegmental space dividing said space into channels through which oil circulates in opposite directions, means whereby air is withdrawn centrally from the channel in proximity to the movable bearing surface, and means whereby dirt is withdrawn peripherally from said last named channel.

21. In a bearing, relatively movable bearing members including bearing segments having projections on adjacent segments recessed to provide a chamber including the trailing and leading edges of adjacent segments through which oil may flow in contact with the relatively movable bearing member, said chamber being shaped to facilitate said member giving the oil a rotary motion.

22. In a bearing, relatively movable bearing members including bearing segments provided with a cylindrical chamber in which the oil is given a rotary motion by the action thereon of the movable bearing member, said chamber being so shaped that the movable bearing member forms a chord of the circular cross section of said chamber.

23. In a bearing, relatively movable bearing members including bearing segments providing one or more intersegmental chambers in which the oil is given a rotary motion by the movement of the movable bearing member, said chamber being so shaped that the movable bearing surface forms a chord of the circular cross section of said chamber, and an outlet aperture arranged axially of the intersegmental chamber to permit the escape of air.

24. In a bearing, relatively movable bearing members including bearing segments providing one or more intersegmental chambers in which the oil is given a rotary motion by the movement of the movable bearing member, and a passage leading from the wall of the intersegmental chamber through which dirt may escape.

25. In a bearing, relatively movable bearing members including bearing segments providing one or more intersegmental chambers in which the oil is given a rotary motion by the movement of the movable bearing member, one or more outlet apertures arranged axially of said chamber to permit the escape of air, and a passage leading from the wall of said chamber through which dirt may escape.

26. In a bearing, in combination with relatively movable bearing members including bearing segments providing one or more spaces between adjacent segments, inner and outer baffles disposed across the intersegmental space for constricting the circulation of oil therethrough and preventing entrainment of air.

27. In a bearing, in combination with relatively movable bearing members including bearing segments, a baffle at the radially inner end of an intersegmental space for maintaining a body of oil in contact with the inner periphery of the movable bearing member and a second baffle associated with said intersegmental space and arranged so that its edge constricts the flow of oil therethrough.

28. In a bearing, in combination with relatively movable bearing members including bearing segments, baffles arranged adjacent the inner and outer ends of an intersegmental space and having their edges so related to the movable bearing surface that the circulation of oil through the intersegmental space is insufficient to entrain air at the inner edge of the movable bearing surface.

29. In a bearing, in combination with relatively movable bearing members including bearing segments, baffles arranged at the inner and outer edge of an intersegmental space and spaced from the inner and outer peripheries of the movable bearing member to restrict the amount of oil circulation induced by said movable bearing member.

30. In a bearing, in combination with relatively movable bearing members including bearing segments, means dividing an intersegmental space into a plurality of channels through which oil circulates in opposite directions, and means to restrict the inlet of the channel through which the oil flows radially outward.

31. In a bearing, in combination with relatively movable bearing members including bearing segments, means dividing an intersegmental space into communicating channels through which oil flows in opposite directions, and means constricting the flow of oil through the channel through which sail oil flows radially outward to minimize the entrainment of air therewith.

32. In a bearing, in combination with relatively movable bearing members including bearing segments, means in an intersegmental space dividing the same into channels through which the oil flows in opposite directions, and baffles positioned adjacent the opposite ends of the channel through which the oil flows radially outward for controlling the rate of oil circulation in said last named channel.

33. In a bearing, in combination with relatively movable bearing members including bearing segments, means in an intersegmental space dividing the same into communicating channels through which the oil flows in opposite directions and formed to constrict the circulation of oil through the channel through which the oil flows radially outward.

34. In a bearing, in combination with relatively movable bearing members including bearing segments, means in an intersegmental space dividing the same into channels through which the oil flows in opposite directions and formed to constrict the inlet through which the oil flows radially outward to prevent exposure to the air of the inner edge of the movable bearing surface.

35. In a bearing, in combination with relatively movable bearing members including bearing segments, means in an intersegmental space dividing the same into communicating channels through which the oil flows in opposite directions and formed to constrict the outlet of the channel through which the oil flows radially outward to prevent flow of oil in said channel so rapidly as to entrain air therewith.

36. In a bearing, relatively rotatable bearing members including bearing segments, a member on which said segments are tiltably mounted, and one or more dowel pins on each segment for engagement in apertures in said member to secure said segments in position, whereby said segments may be removed radially when the member on which the segments are mounted and the bearing member cooperating with the segments are relatively moved axially by an amount equal to the extent of projection of said dowel pins over the maximum thickness of said segments.

37. In a bearing, relatively rotatable bearing members including bearing segments, a stationary member provided with apertures, and one or more dowel pins on each segment adapted to be engaged in said apertures to secure said segments in operative position, whereby said segments may be withdrawn from operative position when said stationary member and movable bearing member are relatively moved axially by an amount equal to the amount by which said dowel pins normally extend into said apertures.

38. In a bearing, a relatively rotatable bearing member, a stationary bearing structure including a supporting member for bearing shoes, one or more bearing shoes tiltably mounted on said supporting member and cooperating with said relatively rotatable bearing member, and a pair of dowel pins carried by each shoe and engaged in apertures provided in said stationary bearing structure for retaining each shoe against both radial and circumferential displacement.

In testimony whereof I have signed this specification.

HARRY A. S. HOWARTH.